United States Patent [19]

Lang, Jr.

[11] 4,099,869

[45] Jul. 11, 1978

[54] PRINTING HEAD ASSEMBLY

[75] Inventor: John W. Lang, Jr., Northbrook, Ill.

[73] Assignee: Bell & Howell Company, Chicago, Ill.

[21] Appl. No.: 750,084

[22] Filed: Dec. 13, 1976

[51] Int. Cl.² .......................................... G03B 27/10
[52] U.S. Cl. ................................... 355/108; 352/228; 355/117
[58] Field of Search ................... 355/97, 98, 104, 108, 355/110, 117; 352/12, 26, 221, 228

[56] References Cited

U.S. PATENT DOCUMENTS

| 2,235,907 | 3/1941 | Tondreau | 355/98 |
| 2,240,083 | 4/1941 | Tondreau | 355/98 |
| 2,835,180 | 5/1958 | Capstaff | 355/98 X |

*Primary Examiner*—Richard A. Wintercorn
*Attorney, Agent, or Firm*—Robert J. Schneider; Roger M. Fitz-Gerald; Stanley J. Tomsa

[57] ABSTRACT

A printing head assembly for exposing raw stock film with a preprint film in a contact film printer including a dual roller gate assembly. The dual roller gate assembly includes a pair of rollers mounted on a roller frame for engaging the preprint film and raw stock film on opposite sides of the printing aperture for wrapping both the preprint and raw stock film about a segment of the printing sprocket of substantially greater length than the printing aperture. An adjustable biasing spring permits regulation of the tension applied through the rollers to the film runs. The dual roller gate assembly includes a selectively operable retraction device to withdraw the rollers away from the printing sprocket for loading and unloading the film printer. In an alternate embodiment, the dual roller gate assembly is pivotally mounted by an offset shaft which permits pivotal movement of the dual roller gate assembly to provide clearance for loading the film printer.

21 Claims, 6 Drawing Figures

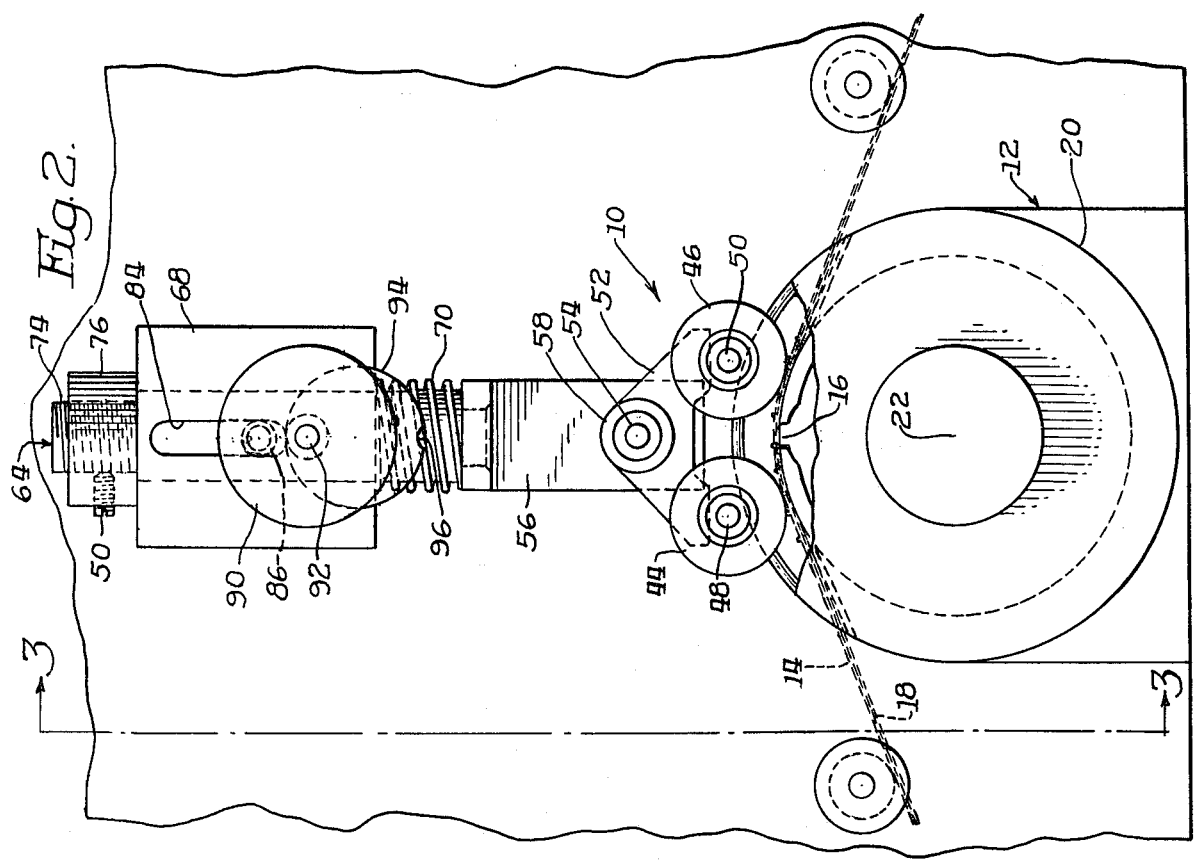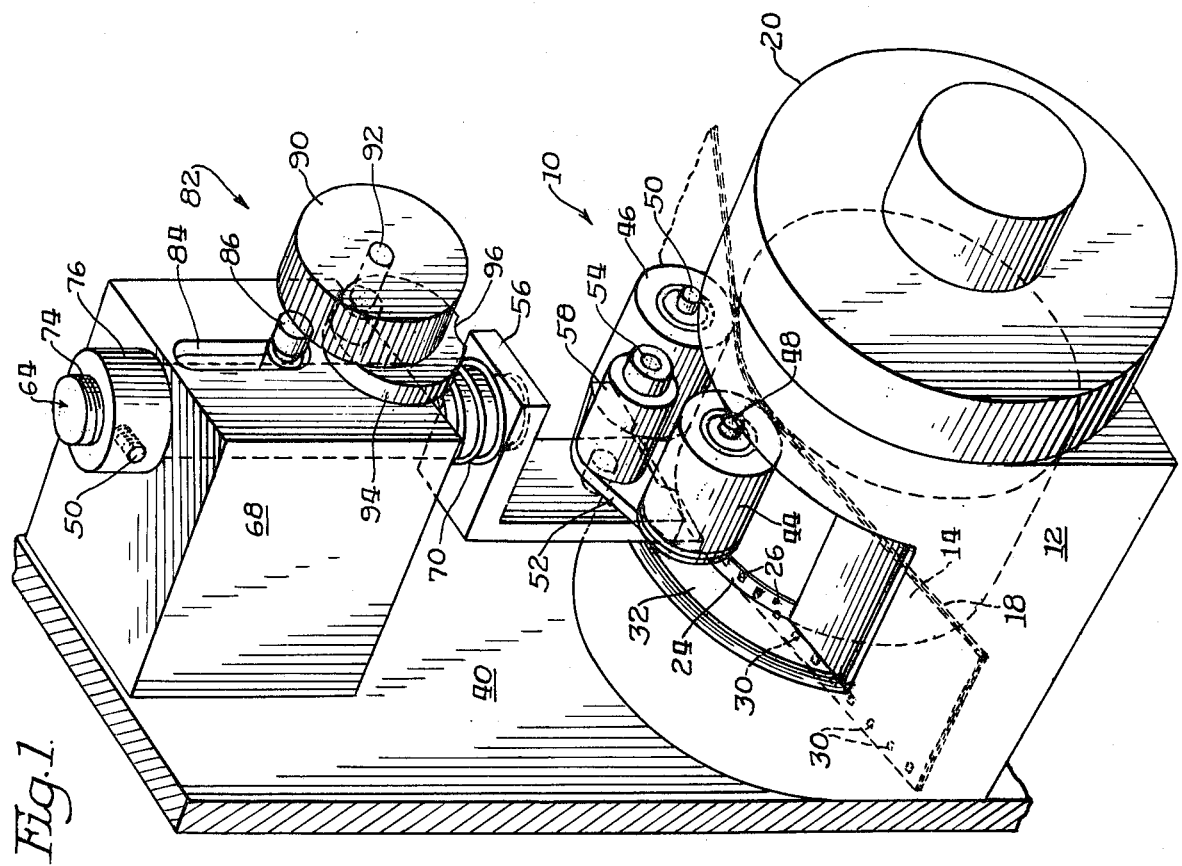

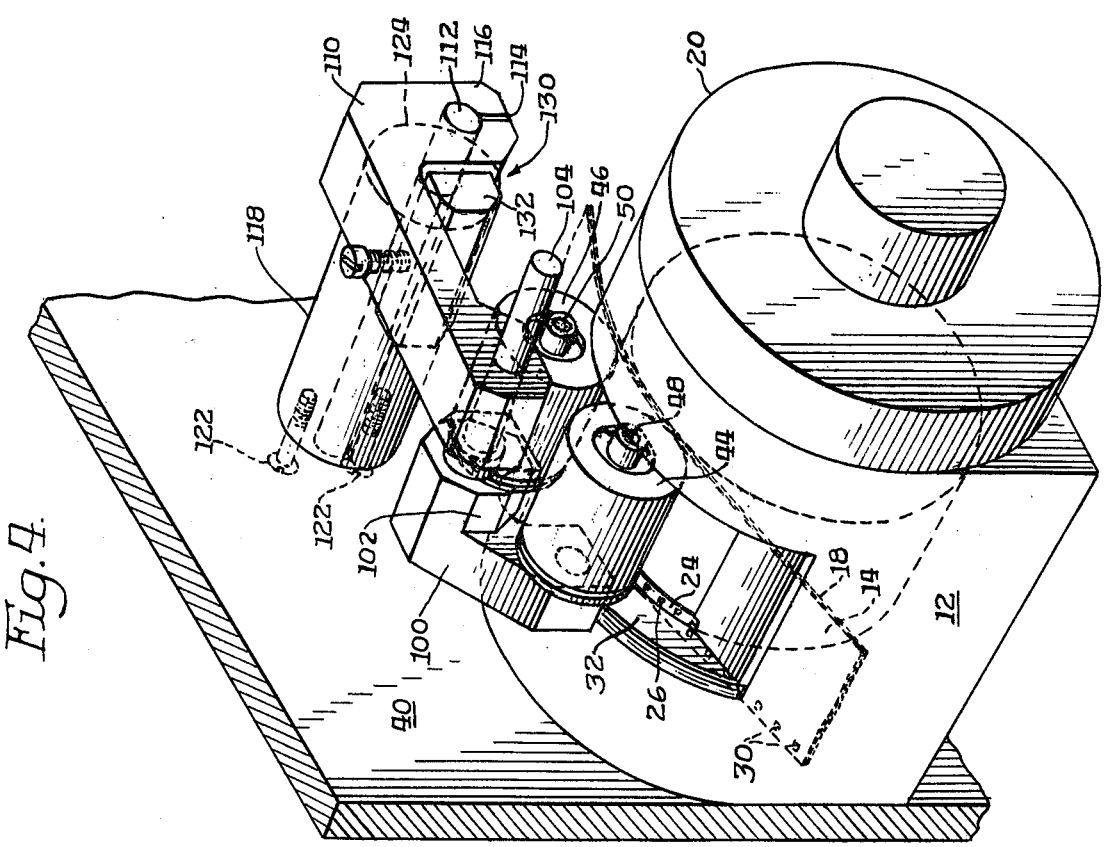
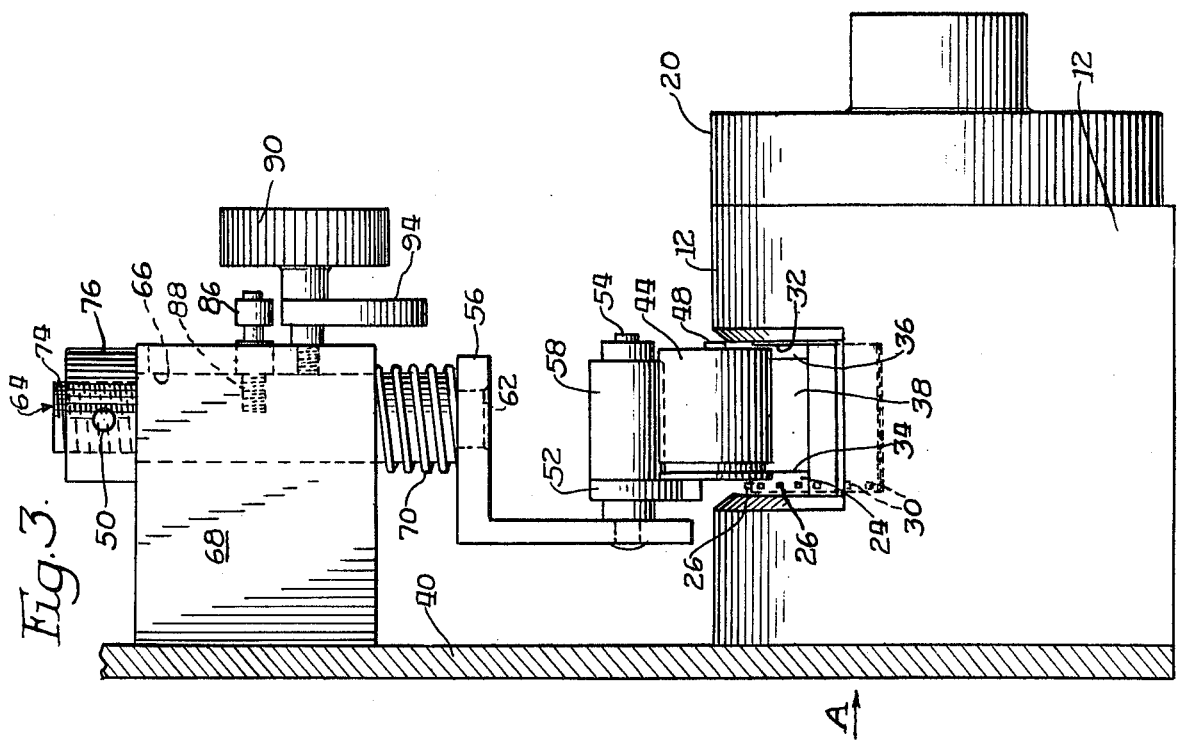

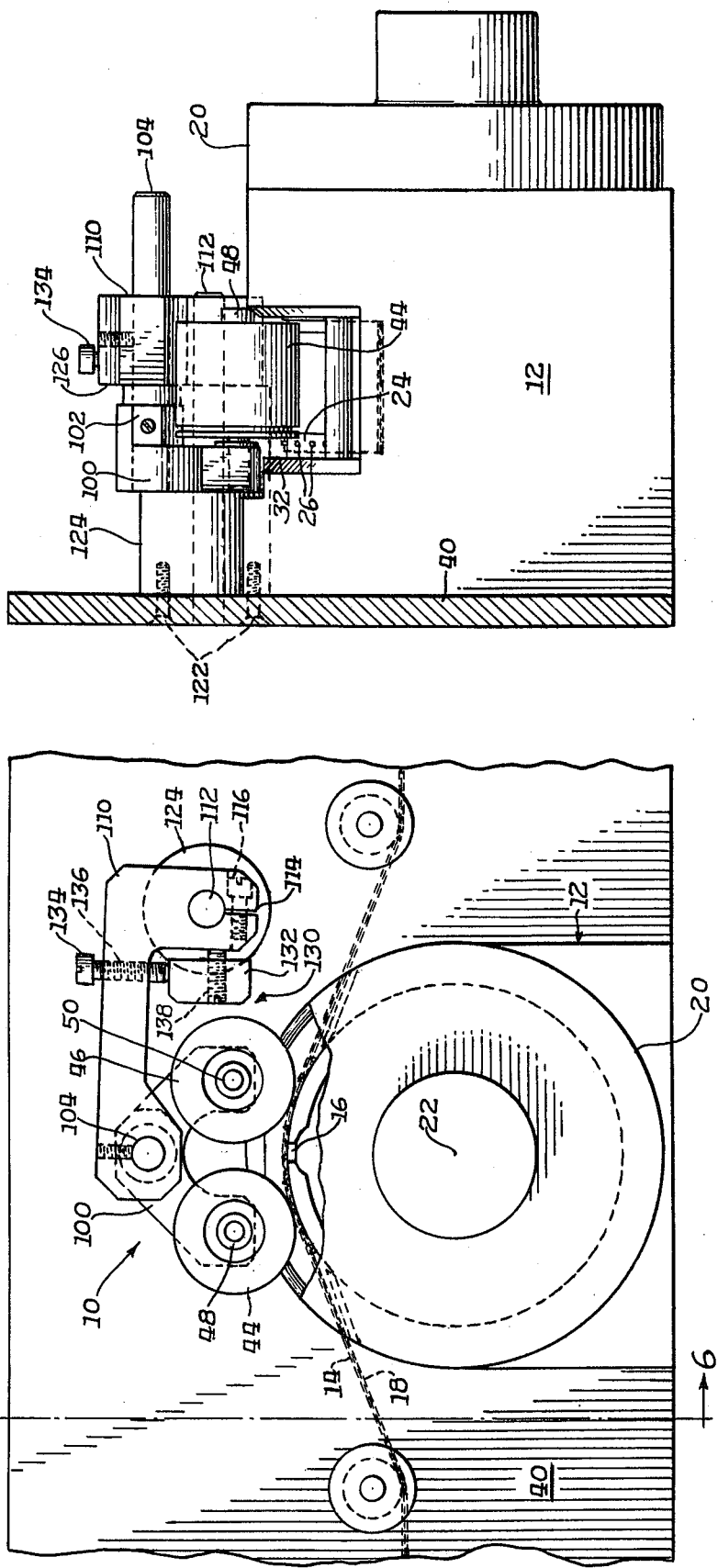

PRINTING HEAD ASSEMBLY

BACKGROUND OF THE INVENTION

1. Field of the Invention

The present invention relates to contact motion picture film printers and, in particular, relates to an improved roller gate assembly for guiding film strips past a projection aperture.

2. Brief Description of the Prior Art

Prior art continuous contact motion picture film printers have normally provided a single precision roller for maintaining the negative and positive films in contact with each other and the film printing drive sprocket as the raw stock film is exposed at the printing light aperture. This construction results in a line contact between the raw stock film and the preprint film as it passes the printing aperture since both the precision roller and printing sprocket rotate about their respective centers.

In contact film printing, the clarity and sharpness of the developed raw stock has been found to be substantially better than those produced on prior contact film printers. However, it is desirable that the raw stock film and preprint film be maintained in contact with one another for a substantial length of their travel past the printing aperture.

SUMMARY OF THE INVENTION

An object of the present invention is to provide an improved roller gate system for use on continuous contact motion picture film printers.

Another object of the present invention is to provide a dual roller gate assembly for maintaining contact between raw stock film and preprint film with the printing sprocket through an arcuate length thereof substantially greater than the length of the printing aperture.

Briefly, the present invention contemplates a dual roller gate printing head assembly for exposing raw stock film with a preprint film in a contact film printer. The dual roller gate assembly includes a pair of rollers mounted on a roller frame for engaging the preprint film and raw stock film on opposite sides of the printing aperture for wrapping both the preprint and raw stock film about a segment of the printing sprocket of substantially greater length than the printing aperture. Biasing means permits regulation of the tension applied through the rollers to the film runs. The dual roller gate assembly includes a selectively operable retraction device to withdraw the rollers away from the printing sprocket for loading and unloading the film through the printer. In an alternate embodiment, the dual roller gate assembly is pivotally mounted by an offset shaft which permits pivotal movement of the dual roller gate assembly to provide clearance for loading the film printer.

Other objects, features and adavantages of the invention will be apparent from the following detailed description taken in connection with the accompanying drawings.

BRIEF DESCRIPTION OF THE DRAWINGS

FIG. 1 is a perspective view of the dual roller gate assembly of the present invention;

FIG. 2 is a partially fragmented front perspective view of the dual roller gate assembly of the present invention;

FIG. 3 is a side elevational view of the present invention taken generally along line 3—3 of FIG. 2;

FIG. 4 is a perspective view of an alternate embodiment of the dual roller gate assembly of the present invention;

FIG. 5 is a partially fragmented front elevational view of the embodiment of FIG. 4; and FIG. 6 is a side elevational view taken generally along line 6—6 of FIG. 5.

DESCRIPTION OF THE PREFERRED EMBODIMENT

The dual roller gate assembly, generally designated 10 (FIGS. 1 and 2), is shown mounted on a conventional printing head assembly 12 of a continuous contact motion picture film printer. In continuous film printing, referring to FIG. 2, a raw stock film 14 or unexposed film strip is moved past a printing aperture 16 at a continuous, predetermined rate or speed. A similar preprint film strip 18 is sandwiched between the raw stock 14 and the printing aperture 16 so that the images thereon are transferred or photographed on the raw stock film 14 while the two film strips are in a contact, or back-to-back relationship, which obviates the need for any optical elements during printing.

The printing head assembly includes a printing sprocket 24 mounted within a cylindrical housing portion 20 of the printing head assembly 12. A drive shaft (not shown) rotates about a horizontal axis 22 and carries the printing sprocket 24 (FIGS. 1 and 3) at a predetermined constant rate. The printing sprocket 24 includes a plurality of sprocket teeth 26 which engage appropriate sprocket holes 30 along one edge of both the raw stock and preprint film strips 14 and 18, respectively. A cutout portion 32 on the upper surface of the cylindrical housing 20 provides a path of travel for the film strips 14 and 18 within the large outer diameter of the cylindrical housing 20. The sprocket 24 includes an inner, cylindrical guide surface 34 for engaging the film strip 18 on its inner side adjacent the sprocket holes 30. A second bearing ring 36 is conjointly rotatably mounted about the axis 22 to support the side of the film strip 18 opposite the edge bearing the sprocket holes 30. The segment 38 between the two bearing rings 34 and 36 is stationary and includes, at its uppermost point, the printing aperture 16, which is normally approximately 0.188 inches in width.

The entire printing head assembly 12 is mounted to a front wall 40 of a film printer and a printing light beam is provided from behind the wall 40 in the direction of arrow A along the horizontal axis 22 to a point, directly vertically below the printing aperture 16 whereat it is reflected through a 90° angle along the vertical axis through the printing aperture to expose the raw stock 14 with the images present on the preprint film 18.

To insure accurate sharp images on the raw stock film, it is essential that the two film strips 14 and 18 be maintained in as near as perfect contact as they pass across the printing aperture 16. A pair of precision rollers 44 and 46 are rotatably mounted in a position to engage the top of the film strip 14 to maintain the film strip 14 in contact with the preprint film 18 and, to keep the preprint film 18 in contact with both of the guide rings 34 and 36 as it passes the printing aperture 18. The precision rollers 44 and 46 are each rotatably mounted by an axle, 48 and 50, respectively. The roller axles 48 and 50 are secured to a generally triangularly shaped roller support frame 52. The roller support frame 52 is pivotally mounted by a shoulder bolt 54 on a vertically adjustable L-shaped mounting member 56. The roller support frame 52 includes an integral, generally horizontal journal bearing 58 which permits pivotal movement of the roller support frame 52 about the shoulder bolt 54. Therefore, any slight misalignment along the vertical axis between the shoulder screw 54 and the printing aperture 16 is automatically corrected by a slight pivotal movement of the roller support frame 52.

The L-shaped mounting member 56 is secured by a recessed screw 62 to a vertically reciprocating shaft 64. The shaft 64 is slip-fit within a vertical bore 66 provided in a mounting block 68 secured to the machine wall 40. Thus, as the shaft 64 moves within the mounting block 68, the dual roller gate assembly 10 moves therewith. A biasing spring 70 is wrapped about the shaft 64 between the mounting member 56 and the bottom of the mounting block 68 to constantly bias the rollers 44 and 46 into engagement with the film runs to hold them against the printing sprocket 34 and the guide ring 36.

The top of the shaft 64 includes an elongated threaded portion 74 for receiving a bias adjusting stop 76 on the upper end of the mounting block 68. A set screw 80 maintains the adjustment stop in a predetermined position. Therefore, the amount of pressure applied by the spring 70 to the film strips 14 and 18 can be easily adjusted by rotation of the biasing stop 76 on a threaded portion of the shaft 74.

A roller withdrawal means, generally designated 82, permits a quick rapid withdrawal of the rollers 44 and 46 away from the printing head assembly 12 when the operator is loading or unloading the film printer with new sets of film strips. More particularly, referring to FIGS. 1 and 2, the mounting block 68 includes an elongated slot 84 on the front surface thereof, through which a stud 86 protrudes. The stud 86 is securely fastened, as by threads 88, to the vertical shaft 64 to provide two functions. One function of the stud 86 is to maintain the two rollers 46 and 48 in parallel alignment with the film strips 14 and 18 and also to permit withdrawal of the rollers from the printing head. A manually rotatable knob 90 is secured to the front wall of the mounting block 86 by a shoulder screw 92 which permits rotation thereof. An offset cam 94 is secured to the knob 90 and, upon rotation of the knob 90, engages the stud 86 thus raising the shaft 64 and the dual roller gate assembly 10 away from the printing head assembly 12. The offset cam 94 includes a notch or detent 96 on its outer surface in which the stud 86 seats to support the dual roller assembly in its uppermost position after rotation of the knob 180° from its position as shown in FIG. 2. This withdrawal means 82 automatically, upon rotation of the knob 90, retracts the precision rollers 44 and 46 to provide clearance at the printing head assembly 12 for removal and replacement of film strips.

The alternate embodiment of the present invention, shown in FIGS. 4 through 6, incorporates many common elements, and thus, like numerals have been used to identify similar elements.

In the alternate embodiment, the pair of precision rollers 44 and 46 are mounted by a pair of horizontal shafts 48 and 50 to a V-shaped roller mounting yoke 100. The yoke 100 includes a front offset portion 102 secured to a horizontal pivot shaft 104 which permits pivotal movement of the rollers 44 and 46 as described previously. The shaft 104 is rotatably mounted by a generally horizontal, L-shaped mounting member 110, which is secured to a second horizontal shaft 112 by a slotted clamp 114 and set screw assembly 116 (FIG. 5). The horizontal shaft 122 is rotatably mounted within a large cylindrical post 118 mounted to the front of the machine wall 40 by a pair of screws 122 (FIG. 6). The front surface 124 of the cylindrical post 118 provides a flat bearing surface for engagement with the back surface 126 of the support member 110 to vertically align the rollers 44 and 46 with the printing sprocket 24 and guide roller 36. Stop means, generally designated 130, is provided to limit the pivotal travel of the dual roller gate assembly 10 about the shaft 122. More particularly, the stop means comprises a stationary block 132 secured to the cylindrical post 118 as shown in FIGS. 4 and 5. A set screw 134 is provided for a thread fit within a threaded aperture 136 in the horizontal portion of the mounting member 110 for engagement with the top of the block 132 and limits the downward pivotal movement of the dual roller gate assembly 10. Similarly, a set screw 138 in the block 132 extends horizontally into engagement with the vertical leg of the mounting member 110 to limit the upward pivotal travel of the dual roller gate assembly about the shaft 122. This system permits simplified, pivotal movement of the roller gate rollers 44 and 46 for loading and unloading of film in the printing head assembly. For convenience, the horizontal, pivotal shaft 104 extends a substantial distance forwardly of the front surface of the mounting member 110 to facilitate hand grasping by the user to manually pivot the dual roller gate assembly into and out of engagement with the film strip runs.

In another alternate embodiment, the first embodiment is modified slightly as described below. The pair of precision rollers 44 and 46 are replaced by belt pulleys and an additional belt pulley is mounted on the support frame pivot axis 54 in the same plane as the first two pulleys. A flexible belt, such as rubber or the like, is wrapped about the three pulleys and pressure is applied to the raw stock film through the arcuate section of the belt passing between the two lower pulleys. In this manner, contact between the two film strips 14 and 18 is maintained along its entire travel across the printing aperture. The rubber belt may be modified to include a plurality of transverse grooves or troughs which provide a clearance point for the printing sprocket teeth 26 at the one end of the film strips. The flexible belt assures contact between the film strips as they pass the printing aperture.

The foregoing detailed description has been given for clearness of understanding only and no unnecessary limitations should be understood therefrom as some modifications will be obvious to those skilled in the art.

I claim:

1. A printing head assembly for exposing raw stock film with a preprint film in a contact film printer, comprising:
    a printing head including a film printing aperture and a printing sprocket for engaging film sprocket holes;
    drive means connected to the printing sprocket for moving the raw stock film and preprint film past the printing aperture at a predetermined rate; and
    a pair of film engaging rollers for rollingly engaging the film on each side of the printing aperture for maintaining the raw stock and preprint film in contact with one another and in engagement with said printing sprocket through a predetermined arcuate segment thereof substantially greater than the length of said printing aperture.

2. The printing head assembly of claim 1 including an idler ring conjointly rotatably mounted with said printing sprocket for supporting the edge of said film strips opposite the edge having said sprocket holes.

3. The printing head assembly of claim 1 wherein said rollers are mounted by a movable roller frame for engaging said raw stock film on the side opposite said printing aperture.

4. The printing head assembly of claim 3 wherein said roller frame includes biasing means to constantly urge the rollers into engagement with said raw stock film to maintain the raw stock film and preprint film in engagement with the arcuate surface of the printing sprocket.

5. A printing head assembly for exposing raw stock film with a preprint film in a contact film printer, comprising:
   a printing head including a film printing aperture and a printing sprocket for engaging film sprocket holes;
   drive means connected to the printing sprocket for moving the raw stock film and the preprint film past the printing aperture at a predetermined rate;
   a roller mounting frame;
   a pair of rollers rotatably mounted on said roller frame;
   biasing means to constantly urge the rollers into engagement with said film for maintaining the raw stock and preprint film in engagement with the printing sprocket through a predetermined arcuate segment thereof; and
   stop means mounted on the roller frame to limit the travel of the rollers under the influence of said biasing means.

6. The printing head assembly of claim 3 including manually operable roller withdrawal means for selectively moving said rollers out of engagement with said raw stock film to facilitate loading or unloading of the film printer.

7. The printing head assembly of claim 6 wherein said roller withdrawal means includes cam means for engaging said roller frame for moving the rollers out of engagement with said raw stock film as the cam means is rotated.

8. The printing head assembly of claim 7 wherein said cam means includes detent means for maintaining said rollers in a retracted position, out of engagement with said raw stock film.

9. The printing head assembly of claim 1 wherein said roller means comprises a pair of rollers rotatably mounted on a roller frame, said roller frame being pivotally mounted with respect to said printing head for permitting joint pivotal movement of said rollers out of engagement with said raw stock film to facilitate loading and unloading of the film printer.

10. A printing head assembly for exposing raw stock film with a preprint film in a contact film printer, comprising:
    a main frame;
    a printing head mounted on said main frame including a film printing aperture and a printing sprocket for engaging the sprocket holes in said preprint film and said raw stock film;
    drive means connected to said printing sprocket for moving the raw stock film and preprint film past the printing aperture at a predetermined rate;
    a roller mounting frame pivotally mounted to said main frame; and
    a pair of rollers mounted on said roller mounting frame for maintaining the raw stock film and the preprint film in engagement with said printing sprocket through a predetermined arcuate segment thereof greater than the length of said printing aperture, as said preprint film and raw stock film is moved past the printing aperture.

11. The printing head assembly of claim 10 wherein said rollers are mounted by a movable roller frame and include biasing means between said main frame and said roller frame to constantly urge the rollers into engagement with said raw stock film to maintain the raw stock film and preprint film in engagement with one another and with the arcuate surface of said printing sprocket as the films move past said printing aperture.

12. The printing head assembly of claim 11 including stop means mounted on said roller frame to limit the travel thereof with respect to said frame under the influence of said biasing means.

13. The printing head assembly of claim 10 including manually operable roller withdrawal means for selectively moving said rollers out of engagement with said raw stock film to facilitate loading or unloading of the film printer.

14. The printing head assembly of claim 13 wherein said roller withdrawal means includes cam means for engaging said roller frame for moving the rollers out of engagement with said raw stock film as the cam means is rotated.

15. The printing head assembly of claim 14 wherein said cam means includes detent means for maintaining said rollers in a retracted position, out of engagement with said raw stock film.

16. The printing head assembly of claim 4 including means for adjusting the biasing force applied by said biasing means.

17. The printing head assembly of claim 16 wherein said biasing means comprises a spring.

18. The printing head assembly of claim 16 wherein said adjustment means comprises a threaded shaft.

19. A printing head assembly for exposing raw stock film with a preprint film, comprising:
    a frame;
    a printing head mounted on said frame including a film printing aperture and a printing sprocket for engaging the sprocket holes in said preprint film and said raw stock film;
    drive means connected to said printing sprocket for moving the raw stock film and the preprint film past the printing aperture at a predetermined rate;
    a movable roller mounting frame;
    a pair of rollers mounted on said movable frame for maintaining the raw stock film and preprint film in engagement with the printing sprocket through a predetermined arcuate segment thereof greater than the length of said printing aperture;
    biasing means between said frame and said roller mounting frame to constantly urge the rollers into engagement with said film; and
    stop means mounted on said roller mounting frame to limit the travel thereof with respect to said frame under the influence of said biasing means.

20. The printing head assembly of claim 19 including means for adjusting the biasing force applied by said biasing means.

21. The printing head assembly of claim 20 wherein said biasing means comprises a spring.

* * * * *